Nov. 29, 1966       R. W. DAVIDSON       3,288,411
CARGO HANDLING APPARATUS
Original Filed July 19, 1963                4 Sheets-Sheet 4
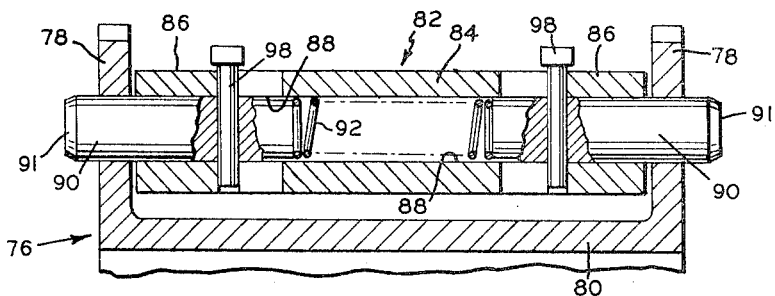
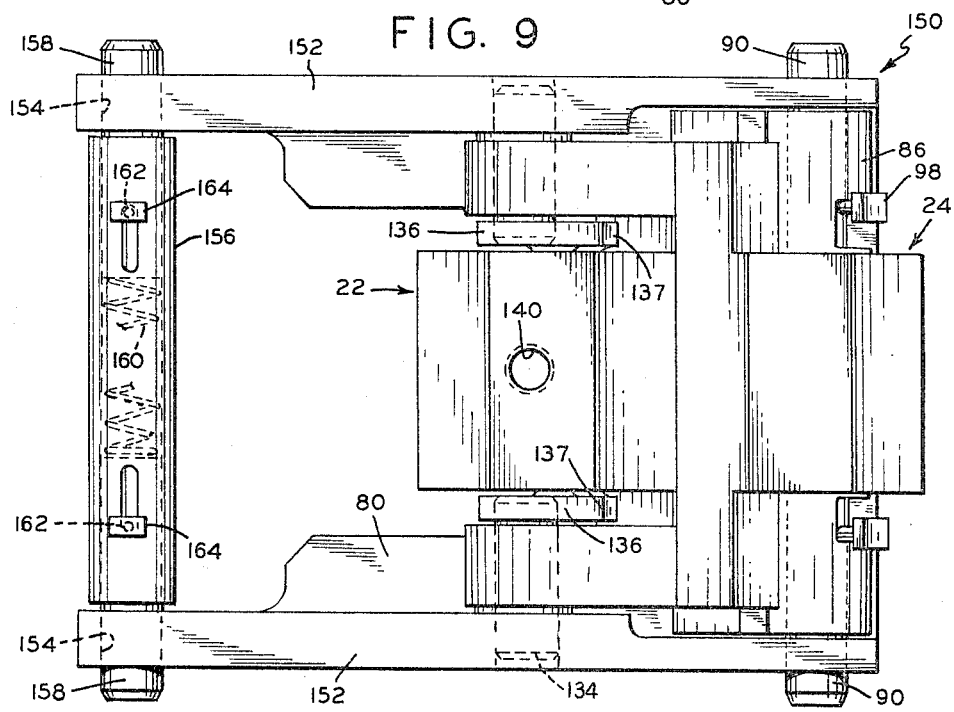
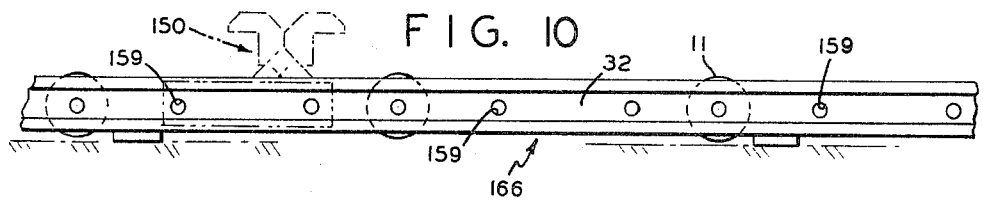
INVENTOR.
ROBERT W. DAVIDSON
BY
ATTORNEY.

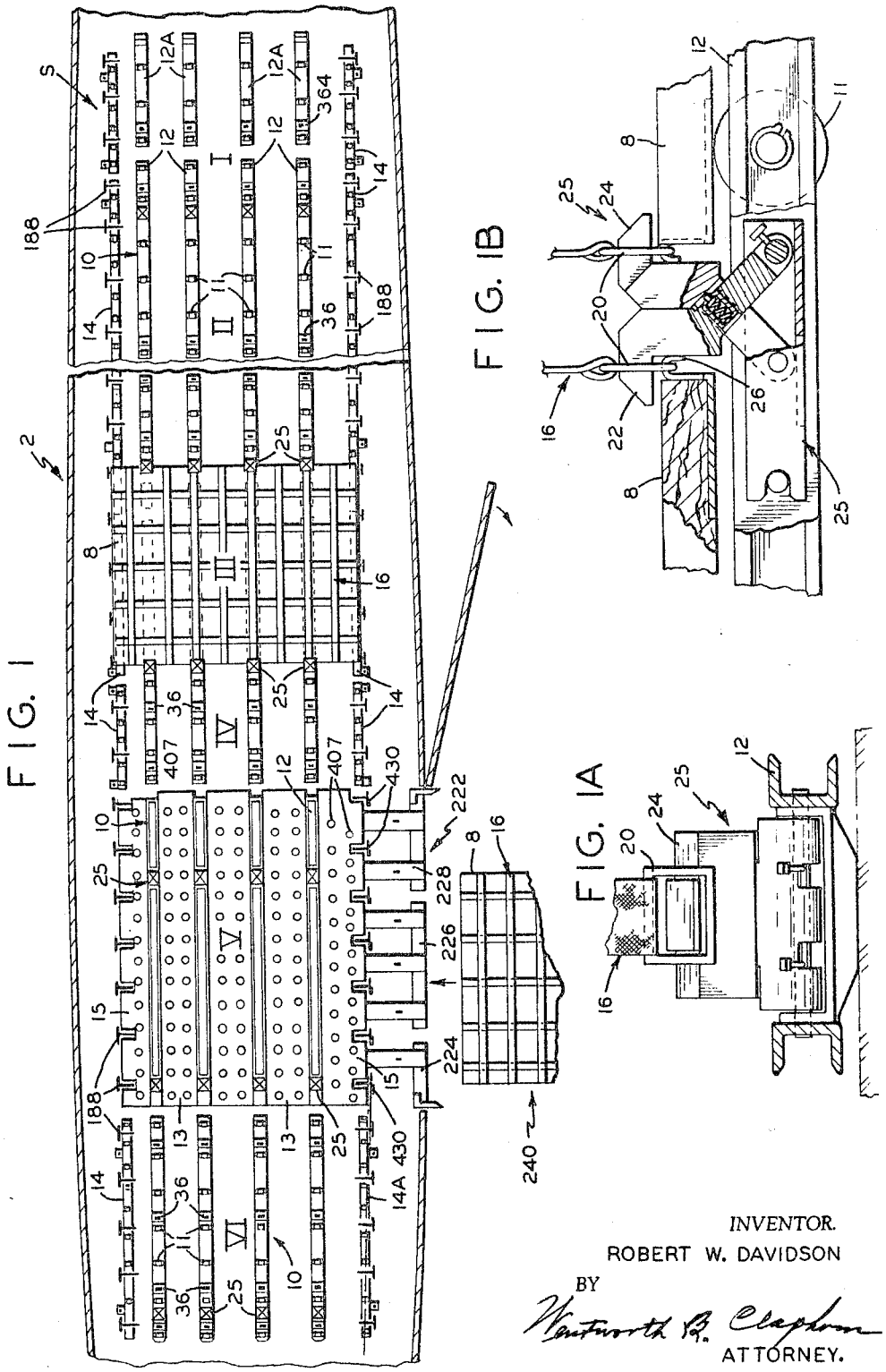

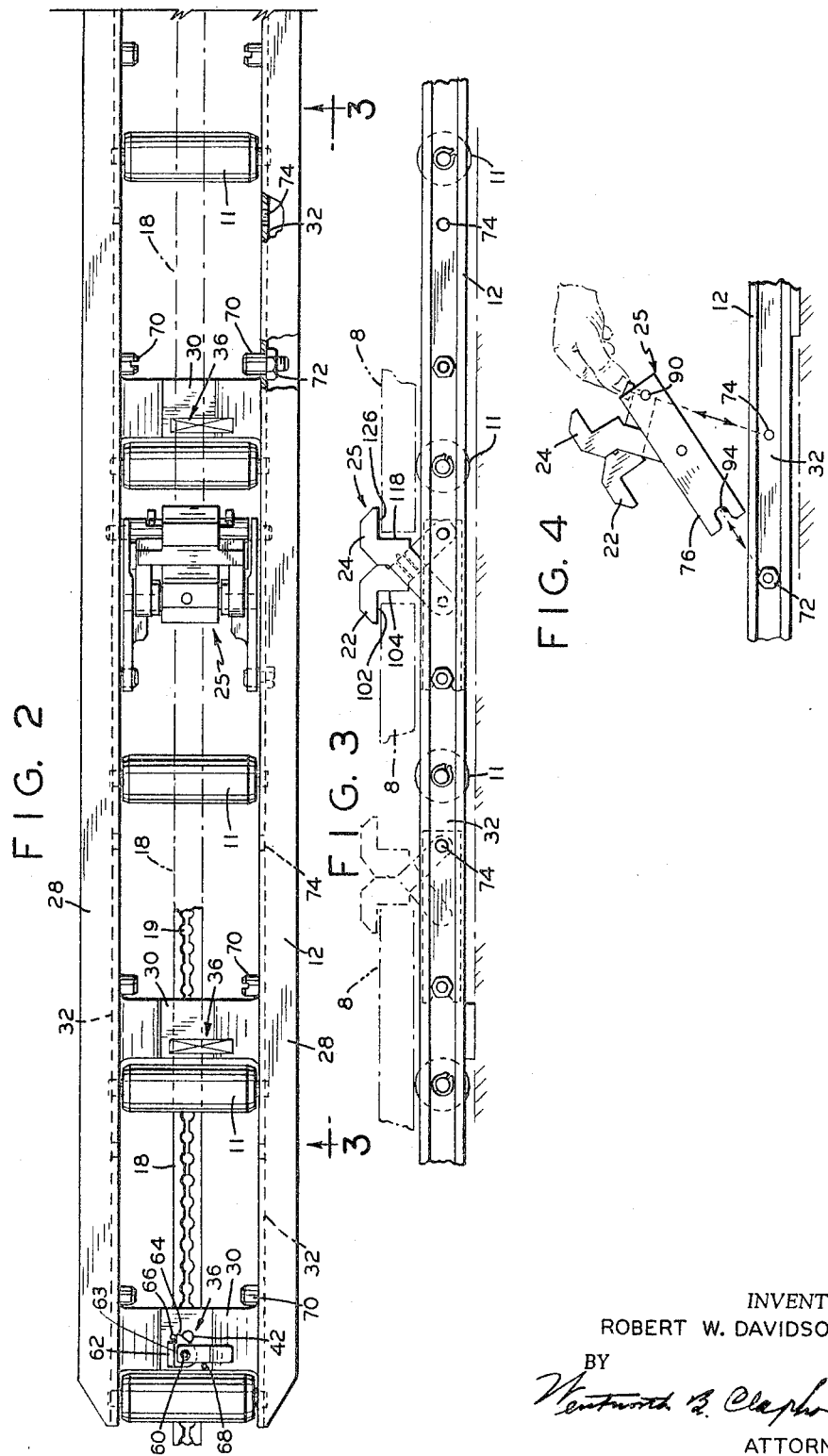

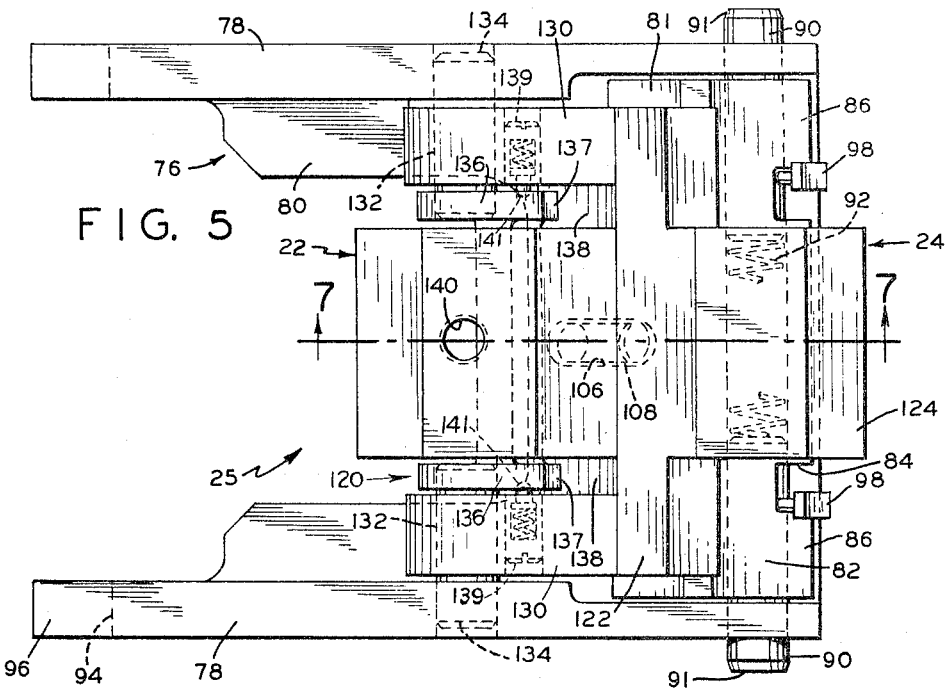
FIG. 5
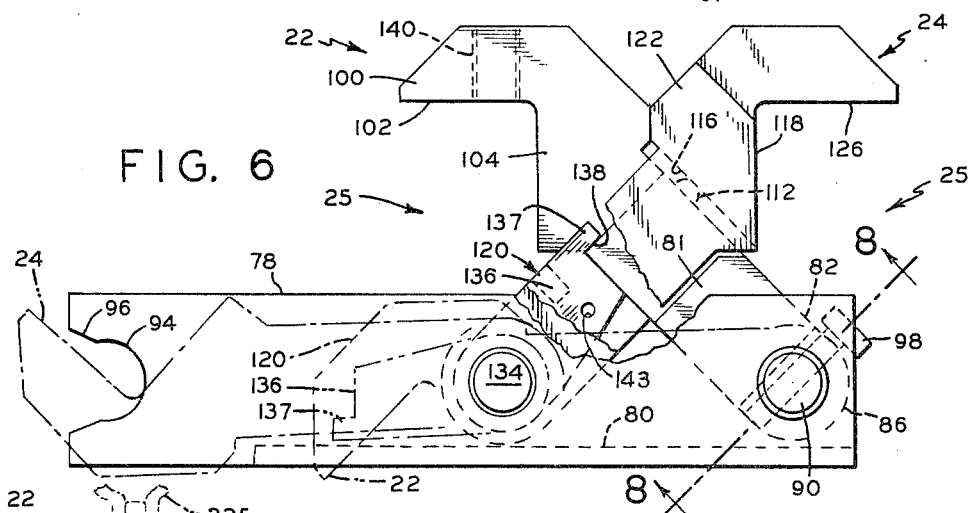
FIG. 6
FIG. 7
INVENTOR.
ROBERT W. DAVIDSON
BY
Wentworth B. Clapham
ATTORNEY.

United States Patent Office 3,288,411
Patented Nov. 29, 1966

3,288,411
CARGO HANDLING APPARATUS
Robert W. Davidson, York, Pa., assignor to American Machine & Foundry Company, a corporation of New Jersey
Original application July 19, 1963, Ser. No. 296,177. Divided and this application Dec. 30, 1965, Ser. No. 517,650
8 Claims. (Cl. 248—119)

This application is a division of my copending application Serial No. 296,177, filed July 19, 1963.

This invention relates to cargo handling apparatus and more particularly to improvements in apparatus which is operative to restrain palletized or containerized cargo against movement under all load conditions which may occur while vehicles which are transporting such cargo are in motion.

The present invention is readily adaptable for use in all types of commercial vehicles such as trucks, railroads, cars, ships and aircraft. However, it finds particular applicability in high speed carriers, such as modern airplanes, because of the fact that the apparatus embodying the invention is so designed and constructed that heavily loaded pallets can be rapidly loaded into an aircraft, and its load so secured that under all conditions of flight, including emergency crash landing conditions, the cargo will be securely maintained in safely locked condition against movement from the time it leaves its point of departure until it is delivered at its destination.

The apparatus disclosed herein embodying the invention comprises mechanism which is adapted for use in what can be termed a modular system. This is because each set or group of transversely spaced and arranged roller trays or conveyors is detachably connected to the seat rails or other suitable securing means mounted to the floor structure of the carrier, such as an airplane, in which they are installed such that each group can operate as a load securing entity regardless of whether or not other sets or groups of roller trays or conveyors are in operation. Also means are provided for readily adapting the system to accommodate pallets of different lengths and widths. Thus the loading pattern in a given carrier can be conformed to meet any particular loading problem.

It is an object of the invention to provide a novel cargo handling apparatus for a cargo carrier, such as an airplane, having roller trays mounted in a carrier, provided with detachable locking units which can be installed at selected positions in the trays, and guide units associated with the roller trays which make it possible to adapt the apparatus for rapid conversion for handling and securing pallets all of one size or of differing sizes within a selected range so that cargo can be transported safely without failure under the most rigorous conditions imposed upon a carrier under any and all conditions to which the carrier may be subjected during its travel from a point of departure to its destination.

It is a further object of the invention to provide a novel cargo handling apparatus wherein in an aircraft having two or more consecutive stations, a further means is provided for positioning and maintaining loaded pallets at selected stations by means of detachable locking units, which can be repositioned as desired, including locking dogs, for coaction with the loaded pallets for purposes of weight distribution to secure them at such locations.

The invention is further characterized by the provision of a novel cargo handling apparatus having pallet supporting roller conveyor trays in which means are provided for detachably supporting locking dog units and wherein these units can be removed from the trays and repositioned therealong as desired, and wherein, due to the novel construction of the locking units and their supporting trays, loaded pallets secured upon the trays can be closely adjacent or spaced from each other in order to distribute weight properly in the aircraft. It is sometimes desirable to have an aisle alongside the cargo for inspection purposes, fire fighting or as an escapeway, and for interchange of pallets designed for use in a narrower or lesser width airplane. Therefore, the invention further consists in the provision of novel mechanism in the form of selectively operated side guide mechanism which makes it possible for all or selected portions only of the cargo space in an aircraft to handle pallets of a lesser width than that for which the system normally is designed to handle. This can be done without disturbing or sacrificing the other adjustable features of the system.

It is a further object of the invention to provide a novel cargo handling system capable of handling unitized loads and one in which loading and unloading of cargo can be effected in a minimum of time.

With these and other objects not specifically mentioned in view, the invention consists in the novel features pointed out and described more in detail hereinafter, and set forth in the claims hereunto appended.

FIGURE 1 is a somewhat diagrammatic partial plan view showing a preferred embodiment of the invention installed in a vehicle, such as an airplane.

FIGURE 1A is an end view of a locking unit in operative position.

FIGURE 1B is a side view, partly in section, of the unit shown in FIGURE 1A.

FIGURE 2 is a plan view of a section of a typical roller tray or rail embodying the invention.

FIGURE 3 is a side view taken on line 3—3 in FIGURE 2.

FIGURE 4 illustrates one way in which a locking unit is installed or removed from a roller tray.

FIGURE 5 is a plan view of a preferred embodiment of locking unit embodying the invention.

FIGURE 6 is a side view of the unit shown in FIGURE 5.

FIGURE 7 is a partial sectional view taken on line 7—7 in FIGURE 5.

FIGURE 8 is a view taken on line 8—8 in FIGURE 6.

FIGURE 9 is a plan view of a modified form of locking unit.

FIGURE 10 is a side view of a length of a modified form of roller tray or rail for use with the unit shown in FIGURE 9.

Referring to the drawings, FIGURE 1 discloses a carrier, in this case an airplane 2 provided with a door 4 through which cargo, generally loaded on pallets 8 is loaded and unloaded in airplane 2. Any suitable conventional device (not shown) can be used for loading and unloading cargo into airplane 2. The floor of airplane 2 is provided with a novel roller conveyor system embodying the invention designated generally S.

As shown in FIGURE 1, there are several stations where loaded pallets 8 can be held securely against movement until it is desired to unload the airplane and remove one or all of the loaded pallets. In FIGURE 1, a loaded pallet is shown located at a station designated III. This pallet can, of course, be moved on roller conveyor system S in the loading of the aircraft to any other station as hereinafter described. Suffice it to say when each loaded pallet is located at a selected station it is held securely at that station against movement by mechanism described more in detail hereinafter.

System S comprises a plurality of elongated tracks designated generally 10, which preferably are detachably secured to the floor of airplane 2. Tracks 10 are provided with longitudinally spaced low friction conveyor means, such as rollers 11, as shown in FIGURES 1 and 2.

These tracks extend longitudinally along the floor of airplane 2 and their length is governed by the amount of space in airplane 2 given over to handling of cargo. In some aircraft all available space is used for cargo; in others part may be used for cargo and part for passengers.

In the system S shown installed in airplane 2 in FIGURE 1, tracks 10 comprise four inner conveyor trays 12 and two outer trays 14. The length of trays 12 and 14 constituting a track 10 can be varied as required in order to meet the requirements for installing a system S in the allotted space available in a carrier. This construction of the system insures great flexibility not only in installation in an aircraft or other carrier, but also makes possible the best uses of cargo space and provides for a different location of pallets. Furthermore, it provides for the proper distribution of weight in order to obtain proper distribution of weight and balance in an aircraft.

Loaded pallets 8 are moved on ball mats 13 and 15, of suitable conventional design, and conveyor tracks or trays 12 and 14 into predetermined flight positions or locations, as at stations I, II, III, IV, V and VI, between locking dog units 25 at the ends of each securing station I–VI, described more in detail hereinafter.

Cargo loaded on a pallet 8 is contained thereon by means of a net 16 comprising crossing tapes preferably formed of nylon or other suitable high-strength material. As shown in FIGURES 1A and 1B, the terminal ends of the downwardly extending tapes at the fore and aft ends of a pallet as loaded into airplane 2, and provided with metal rings 20 through which locking dogs 22 and 24 extend. As illustrated in FIGURE 1B, locking dogs 22 and 24 of a locking dog unit, designated generally 25, are shown in operative relationship with respect to two pallets 8 arranged in end to end relationship, as for example at stations I and II or stations II and III, in airplanes 2 shown in FIGURE 1. Rings 20 engage hooks 26 which are mounted along the edge of pallet 8 much in the manner as that shown in my copending application Serial No. 261,930, filed February 11, 1963, now Patent No. 3,251,489.

An important feature of the invention is the provision of a novel construction, wherein for the first time in the art the locking means of a cargo handling apparatus can be moved from one selected position to another with great ease and dispatch. This novel construction makes it possible to adapt an installation in such manner that practically any length of pallet can be handled. In the same manner a plurality of pallets of different lengths can be locked against movement and transported at the same time. These important advantages and novel results are obtained by providing a tray construction wherein the locking units 25 comprising dogs 22 and 24, can be readily detached from their respective trays 12 and be remounted at selected positions therein corresponding to requirements depending upon the size of pallets to be carried.

As shown in FIGURE 3, the frequency of position selections that are made available for detachably mounting locking units 25 serves a further purpose in addition to that of accommodating different length pallets in that they permit a selection of positions in small increments for securing pallets within the aircraft such that optimum disposition of the load with respect to the center of balance of the aircraft may be accomplished. The positions provided for detachably mounting locking units 25 permit the securing of pallets in consecutive tandem arrangements or in spaced out arrangements as well as in random combinations thereof.

A preferred embodiment of the mechanism for effecting the removal and relocation of units 25 is shown in FIGURES 2, 3, 4, and 5–8. Referring now to FIGURES 2, 3, and 4, it will be seen that in the spaces between rollers 11, walls 32 support sets of opposed aligned studs 70 which provide mounting supports for locking units 25. Studs 70 are provided with a reduced portion (not shown) supported in holes in walls 32. Their free ends are threaded so that lock nuts 72 of a suitable conventional design can be turned home thereon to secure studs in assembled arrangement in trays 12. Walls 32 of channel portions 28 also are provided with longitudinally spaced bores 74 whose centers are horizontally aligned with the centers of studs 70. Thus when units 25 are assembled in a tray 12, their frames 76 and dogs 22 and 24 carried thereby will be properly positioned therein.

From a reference to FIGURE 1, and from what has been hereinabove concerning the provision of mounting mechanism for locking dog units 25, it will be understood that depending upon its length each tray can support one or more locking units, except in the case of a very short tray 12 mounting a single transverse roller 11. Certain trays shown at the extreme right in FIGURE 1, described more in detail hereinafter may be provided with another type of locking device, and hence not require a lock dog unit 25.

FIGURES 2–8 disclose a preferred form of locking dog unit 25 as used in an installation such as shown in FIGURE 1. Because all these units are the same in construction and operation, it is considered necessary only to describe a single unit. Referring particularly to FIGURES 5–7, inclusive, unit 25 comprises a frame 76 having two elongated vertical side plates 78 connected by an integral transverse base plate 80. Side plates 78 support a front locking dog 22 and a rear locking dog 24, as viewed in FIGURES 1B and 3, wherein dog 22 coacts with the front end of a pallet 8 and dog 24 coacts with the rear end of a pallet 8 and dog 24 coacts with the rear end of an adjacent pallet 8 supported upon trays 12 and 14. The general principle of construction of dogs 22 and 24 is somewhat the same as that disclosed in my above referred to copending patent application Serial No. 261,930. However, the structure is markedly improved and the novel results obtained in versatility, flexibility of system, mounting and use constitute an important advance in the art.

Front dog 22, as shown in FIGURES 1B, and 5–7, comprises a block member 81 having at one end a base 82 provided with a central portion 84 and two side portions 86 with an axial bore 88 passing therethrough. Extending through each side plate 78 and bore 88 in each portion 86 and into central portion 84 is a slidable short shaft 90. Located in bore 88 in central portion 84 is a spring 92 which bears against the ends of shafts 90 and normally tends to maintain them projecting beyond the outer faces of plates 78 a distance equal to, or a little greater than the width of walls 32 of trays 12. The free ends of side plates 78 (see FIGURES 1B and 5–6) are provided with openings or support rests 94 and tapered guide surfaces 96 which assist in positioning support rests 94 and tapered guide surfaces 96 which assist in positioning support rests 94 in seated engagement with studs 70.

Each shaft 90 carries a suitable headed pin 98 extending outwardly therefrom at right angles into the space between central portion 84 and a side portion 86. Thus, when the mechanic installing a unit 25 presses both headed pins 98 together, spring 92 is compressed and the projecting ends 91 of shafts 90 are moved to a position flush with the outer faces of plates 78, at which time as indicated diagrammatically in FIGURE 4, unit 25 can either be lifted out of tray 12 or be installed therein. Upon release of pins 98, spring 92 in expanding forces shafts 90 outwardly to the position shown in FIGURE 5. If a unit 25 is being installed, the mechanic first engages openings 94 with studs 70 after which he swings frame 76 of unit 25 downwardly using studs 70 as a pivot center relative to a tray 12 until shafts 90 are aligned with holes 70. He then releases pins 98 so that when spring 92 expands, the ends 91 of shafts 90 become seated in holes 70 and the unit is ready for operation.

The other end of locking dog 22 comprises a locking lug 100 formed with a substantially horizontal face 102 and a substantially vertical face 104 at right angles thereto for securing a pallet 8 and/or a hold down ring 20, referred to hereinabove. In the preferred embodiment of the invention dog 22 also is provided with a bore 106 in which is threadably seated a spring activated spherical detent 108 preferably located centrally therein, as shown. Detent 108 comprises a spring 110 which bears against and urges pin 112 outwardly through an opening in detent cellar 114 into engagement with face 116 of block member 122 of rear locking dog 24. Detent 108 functions to exert a slight pressure on block member 122 tending to force dogs 22 and 24 apart, which effectively prevents lock latch 120 from moving out of its operative holding position, as by vibration, during flight or a trip. If desired the above described detent mechanism could be omitted without substantially affecting the operation of a locking unit 25.

If desired, one or both legs 130 of dog 124 may be provided with a detent device 139 similar to that shown in FIGURE 7, having a spherical member 141 adapted to engage a dimple 143 in lock latch 120 as an alternate means for maintaining it in latched position.

Locking dog 24 is complementary to dog 22 and comprises a transverse block 122 having a locking lug 124 with a planar underface 126 and a coacting planar face 118 substantially at right angles thereto. Block 122 has two spaced legs 130 having bores 132 at their free ends into each of which is pressfitted a short shaft 134, one of the ends of which extend into openings in plates 78 of frame 76 of unit 25. The other end of each shaft 134 supports a leg of latch lock 120 which is generally similar in design and operation as that disclosed in FIGURES 5 and 5B in my above referred to copending application. Latch lock 120 is provided with spaced locking arms 136 and noses 137 which coact with shoulders 138 of block 81. When dogs 22 and 24 are moved into the positions shown in FIGURES 1B, 3, 5, 6 and 7 and latch lock 120 is moved into its operative position, as described hereinabove, dogs 22 and 24 cannot move out of their operative positions until latch lock 120 is again moved to its inoperative position, as shown in broken lines in FIGURE 6.

Dog 22, if desired, may be provided with a tapped hole 140 into which a tie down ring unit of conventional design can be secured in order to adapt each or selected units to attach ropes, etc., which may be used to secure cargo.

FIGURES 9 and 10 disclose a modified form of locking unit, designated generally 150. In this embodiment, the free ends of side plates 152 which correspond to side plates 78 of a unit 25 (FIGURE 5) are provided with transverse holes or bores 154 instead of openings 94. A transverse sleeve 156 is supported between the free ends of plates 152 by two slidable short shafts 158, the free ends of which project through bores 154, extend beyond the ends of sleeve 156 and are adapted to seat in bores 159 formed in walls 32 of trays 12. A spring 160 located substantially centrally within sleeve 156 normally maintains short shafts 158 in extended positions beyond bores 154 in plates 152.

Short shafts 158 are moved to their retracted inoperative positions in sleeve 156 against the resilient pressure of spring 160 by means of pins 162, one end of each being secured in a short shaft 158. The other ends of pins 162 are provided with finger grips 164 of suitable design which allow a mechanic to engage and press them together to retract short shafts 158 into sleeve 156 so that unit 150 can be mounted in a desired selected position in tray 166, shown in FIGURE 10. Tray 166 is the same in construction and operation as tray 12, described hereinabove, except that studs 170 have been replaced by holes 159 which accommodate short shafts 158. Short shafts 90 and 158 can be of the same diameter such that units 150 can be mounted removably in a tray 166 with the free ends of side plates 152 extending either to the left or right in tray 166 as viewed in FIGURE 13. All other parts of unit 150 including short shafts 90 and their operating means are the same as in unit 25 and no further description is believed to be necessary to a full understanding thereof.

What I claim is:

1. In a device of the type described for use in securing a load against movement relative to a support having mounting means, a locking assembly comprising a frame, a first movable member, a second complementary movable member, at least one of said members having load holding means, means movably mounting said members in said frame for disposal in inoperative positions within the confines of said frame and for movement into operative positions above said frame, and mechanism on said frame for detachably securing said assembly with said mounting means for said support.

2. The invention defined in claim 1 wherein said mounting means of said support comprises supporting studs and seating holes and wherein said securing mechanism comprises recesses in said frame coacting with said studs and movable shafts engageable with said holes.

3. The invention defined in claim 2 wherein said shafts are slidably mounted in said frame for movement relative thereto into said seating holes, and means for moving said shafts to effect their seating engagement with said holes.

4. The invention defined in claim 1 wherein said frame is provided with two sets of outwardly slidable mounting shafts, and means for moving each set of shafts to dispose them in operative relationship in said seating holes.

5. The invention defined in claim 1 including resilient means for effecting the entry of said shafts into said seating holes and retaining them therein.

6. The invention defined in claim 1 wherein said movable members comprise locking dogs, each having a load holding portion, said portions facing in opposite directions when in operative positions, and wherein at least one of said dogs is mounted on said slidable shafts.

7. The invention defined in claim 1 wherein each of said members is provided with a load engaging and holding portion constructed and arranged to face in opposite directions to engage the front and/or rear of a load when in operative positions, and said frame comprises side walls and a bottom portion connecting said walls, and wherein said securing mechanism includes slidable shafts supporting at least one of said members for attachment to said mounting means of said support and means for moving said shafts to effect the engagement of said shafts with said mounting means.

8. The invention defined in claim 1 wherein said support is provided with a plurality of longitudinally spaced mounting means, and means for associating said securing mechanism with selected mounting means, whereby to detachably connect said frame to said support at a selected operating location.

References Cited by the Examiner

UNITED STATES PATENTS

| | | | |
|---|---|---|---|
| 2,205,273 | 6/1940 | Radey | 105—368 |
| 3,059,886 | 10/1962 | Lord | 248—119 |
| 3,159,111 | 12/1964 | Gutridge et al. | 248—119 |

CLAUDE A. LE ROY, *Primary Examiner.*

R. P. SEITTER, *Assistant Examiner.*